United States Patent
Tang et al.

(10) Patent No.: US 11,656,726 B1
(45) Date of Patent: May 23, 2023

(54) CONTROL CIRCUIT, ELECTRONIC DEVICE, AND CONTROL METHOD FOR STYLUS PEN INTERACTING WITH TOUCH PANEL

(71) Applicant: NOVATEK Microelectronics Corp., Hsinchu (TW)

(72) Inventors: Yu-Ying Tang, Taoyuan (TW); Chih Chang Lai, Taichung (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/650,382

(22) Filed: Feb. 9, 2022

(51) Int. Cl.
*G06F 3/044* (2006.01)
*G06F 3/041* (2006.01)
*G06F 3/038* (2013.01)
*G06F 3/0354* (2013.01)

(52) U.S. Cl.
CPC .......... *G06F 3/0442* (2019.05); *G06F 3/0383* (2013.01); *G06F 3/03545* (2013.01); *G06F 3/044* (2013.01); *G06F 3/04162* (2019.05); *G06F 3/04166* (2019.05)

(58) Field of Classification Search
CPC ............ G06F 3/04166; G06F 3/03545; G06F 3/0383; G06F 3/04162; G06F 3/044; G06F 3/0442
See application file for complete search history.

(56) References Cited

U.S. PATENT DOCUMENTS

| | | | | |
|---|---|---|---|---|
| 10,768,719 | B2* | 9/2020 | Ju | G06F 3/03545 |
| 10,921,942 | B2* | 2/2021 | Chen | G06F 3/04162 |
| 11,204,671 | B2* | 12/2021 | Yang | G06F 3/04162 |
| 2011/0193776 | A1* | 8/2011 | Oda | G06F 3/04162 345/157 |
| 2012/0327040 | A1* | 12/2012 | Simon | G06F 3/03545 345/179 |
| 2016/0306497 | A1* | 10/2016 | Nagai | G06F 3/03545 |
| 2017/0153722 | A1* | 6/2017 | Huang | G06F 3/04162 |
| 2017/0192591 | A1* | 7/2017 | Jang | G06F 3/04162 |
| 2019/0163320 | A1* | 5/2019 | Park | G06F 3/03545 |
| 2020/0064940 | A1* | 2/2020 | Chang | G06F 3/0442 |
| 2021/0081060 | A1* | 3/2021 | Fleck | G06F 3/0383 |
| 2022/0100293 | A1* | 3/2022 | Gray | G06F 3/0418 |
| 2022/0334661 | A1* | 10/2022 | Barel | G06F 3/0442 |
| 2022/0365649 | A1* | 11/2022 | Nomura | G06F 3/0383 |

* cited by examiner

*Primary Examiner* — Darlene M Ritchie
(74) *Attorney, Agent, or Firm* — CKC & Partners Co., LLC

(57) ABSTRACT

A control circuit is configured to control a first electrode structure on an electronic device to transmit a first transmitting signal to a touch panel. The control circuit is further configured to control a second electrode structure on the electronic device to transmit a second transmitting signal to the touch panel during a first time interval, and configured to control the second electrode structure to work as a button during a second time interval.

14 Claims, 7 Drawing Sheets

CONTROL CIRCUIT, ELECTRONIC DEVICE, AND CONTROL METHOD FOR STYLUS PEN INTERACTING WITH TOUCH PANEL

BACKGROUND

Technical Field

The present disclosure relates to a control circuit, an electronic device, and a control method. More particularly, the present disclosure relates to a control circuit, an electronic device, and a control method with simpler structure and lower cost.

Description of Related Art

With development of technology, a touch sensor can be integrated into a display panel to form a touch display panel. When a finger of a user touch the screen of the touch display panel, the touch display panel can perform a corresponding operation according to the touch event. In some cases, the user prefers to use precise electronic devices (e.g., an active stylus pen) to interact with the touch display panel.

SUMMARY

Some aspects of the present disclosure are to provide a control circuit. The control circuit is configured to control a first electrode structure on an electronic device to transmit a first transmitting signal to a touch panel. The control circuit is further configured to control a second electrode structure on the electronic device to transmit a second transmitting signal to the touch panel during a first time interval, and configured to control the second electrode structure to work as a button during a second time interval.

Some aspects of the present disclosure are to provide an electronic device. The electronic device includes a body, a first electrode structure, and a second electrode structure. The first electrode structure is disposed on the body and controlled to transmit a first transmitting signal to a touch panel. The second electrode structure is disposed on the body. The second electrode structure is controlled to transmit a second transmitting signal to the touch panel during a first time interval and controlled to work as a button during a second time interval.

Some aspects of the present disclosure are to provide a control method. The control method includes following operations: controlling, by a control circuit, a first electrode structure on an electronic device to transmit a first transmitting signal to a touch panel; controlling, by the control circuit, a second electrode structure on the electronic device to transmit a second transmitting signal to the touch panel during a first time interval; and controlling, by the control circuit, the second electrode structure to work as a button during a second time interval.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
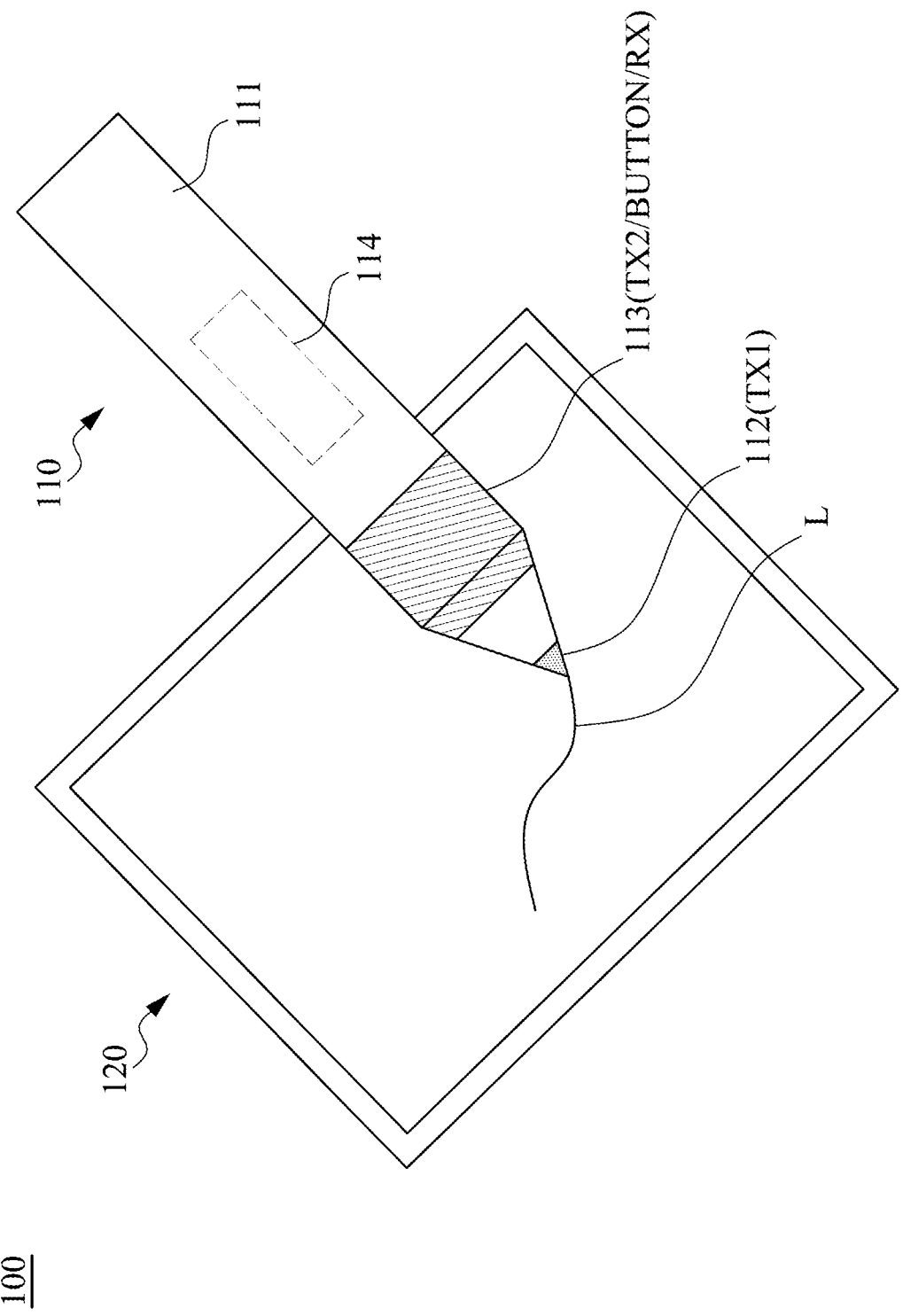
FIG. 1 is a schematic diagram illustrating a touch system according to some embodiments of the present disclosure.

Reference is made to FIG. 1. FIG. 1 is a schematic diagram illustrating a touch system 100 according to some embodiments of the present disclosure.

The touch system 100 includes an electronic device 110 and a touch panel 120. As illustrated in FIG. 1, the electronic device 110 can be an active stylus pen, and a user can utilize the electronic device 110 to interact with (e.g., to touch, to draw, or to write) the touch panel 120.

However, the aforementioned implementation of the electronic device 110 is merely for illustration, and the present disclosure is not limited thereto. Other suitable electronic devices are with the contemplated scopes of the present disclosure.

As illustrated in FIG. 1, the electronic device 110 includes a body 111, an electrode structure 112, an electrode structure 113, and a control circuit 114. The body 111 is in a pen-shape. The electrode structure 112 is disposed on the body 111. To be more specific, the electrode structure 112 is disposed at a tip portion of the body 111. The electrode structure 113 is disposed on the body 111. To be more specific, the electrode structure 113 is disposed at a ring portion of the body 111, and the ring portion is near fingers of the user when the user holds the electronic device 110. The control circuit 114 is disposed inside the body 111 and coupled to the electrode structure 112 and the electrode structure 113. The control circuit 114 is configured to control the electrode structure 112 and the electrode structure 113.

However, shapes of the electrode structure 112 and the electrode structure 113 in FIG. 1 are merely for illustration, and the present disclosure is not limited thereto. Other suitable shapes are with the contemplated scopes of the present disclosure.

The control circuit 114 can control the electrode structure 112 to transmit a transmitting signal TX1 to the touch panel 120. The touch panel 120 can receive the transmitting signal TX1. Accordingly, a processor in the touch panel 120 can detect a touch position according to signal intensity of the received transmitting signal TX1, and the processor in the touch panel 120 can perform a corresponding operation according to the detected touch position.

In addition, the control circuit 114 can control the electrode structure 113 to transmit a transmitting signal TX2 to the touch panel 120. The touch panel 120 can receive the transmitting signal TX1 and the transmitting signal TX2. Accordingly, a processor in the touch panel 120 can determine a tile angle of the electronic device 110 according to a distance between a first position on the touch panel 120 and a second position on the touch panel 120, in which the transmitting signal TX1 is received at the first position on the touch panel 120 and the transmitting signal TX2 is received at the second position on the touch panel 120. For example, when the aforementioned distance is longer, the tile angle of the electronic device 110 from a vertical line is larger. On the contrary, when aforementioned distance is shorter, the tile angle of the electronic device 110 from the vertical line is smaller.

In addition, the control circuit 114 can control the electrode structure 113 to work as a button (button operation BUTTON). To be more specific, the control circuit 114 can detect a touch event on the electrode structure 113. The touch object can be one or more fingers of the user. The electrode structure 113 can be a self-capacitance type or a mutual-capacitance type. The control circuit 114 can control the electronic device 110 to perform an operation according to the touch event. For example, in some embodiments, when a finger touches (presses) the electrode structure 113, the capacitance value of the electrode structure 113 is changed. Accordingly, the control circuit 114 can work with the touch panel 120 to change a color (e.g., changed from red to blue) of a handwriting line L shown on the touch panel 120 along a trajectory of the tip portion of the electronic device 110 according to the capacitance value of the electrode structure 113. In some embodiments, when a finger touches (presses) the electrode structure 113, the capacitance value of the electrode structure 113 is changed. Accordingly, the control circuit 114 can work with the touch panel 120 to change a thickness (e.g., thicker or thinner) of the handwriting line L according to the capacitance value of the electrode structure 113.

Furthermore, the control circuit 114 can control the electrode structure 113 to receive a receiving signal RX from the touch panel 120. The receiving signal RX can be used to synchronize the electronic device 110 and the touch panel 120. For example, the receiving signal RX can be used to synchronize a clock signal of the electronic device 110 and a clock signal of the touch panel 120.

In some related approaches, it needs to dispose different electrode structures on an electronic device (e.g., active stylus pen) for different functions. Thus, in these related approaches, the electronic device includes more electrode structures, the assembly of the electronic device is more complicated, cost is higher, and it is prone to interference between signals.

Compared to the aforementioned related approaches, in the present disclosure, the single electrode structure 113 can be configured for different functions (e.g., transmitting the transmitting signal TX2 and work as a button). Accordingly, in the present disclosure, the electronic device 110 includes fewer electrode structures, the assembly of the electronic device 110 is simpler, and cost and interference between signals can be reduced.

Figure 2:
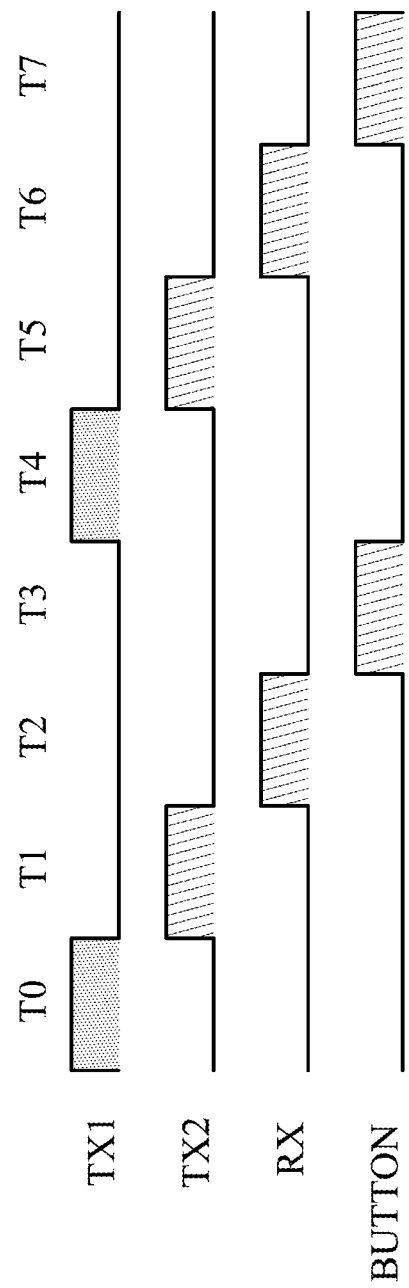
FIG. 2 is a schematic diagram illustrating operations of the electronic device in FIG. 1 according to some embodiments of the present disclosure.

References are made to FIG. 1 and FIG. 2. FIG. 2 is a schematic diagram illustrating operations of the electronic device 110 in FIG. 1 according to some embodiments of the present disclosure.

The electronic device 110 adopts a time-division mechanism. As illustrated in FIG. 2, the electrode structure 112 transmits the transmitting signal TX1 to the touch panel 120 during a time interval T0 and a time interval T4. The electrode structure 113 transmits the transmitting signal TX2 to the touch panel 120 during a time interval T1 and a time interval T5. The electrode structure 113 receives the receiving signal RX from the touch panel 120 during a time interval T2 and a time interval T6. The electrode structure 113 works as the button during a time interval T3 and a time interval T7.

However, an order of operations of the electronic device 110 in FIG. 2 is merely for illustration, and the present disclosure is not limited thereto. Other suitable orders are with the contemplated scopes of the present disclosure.

Figure 3:
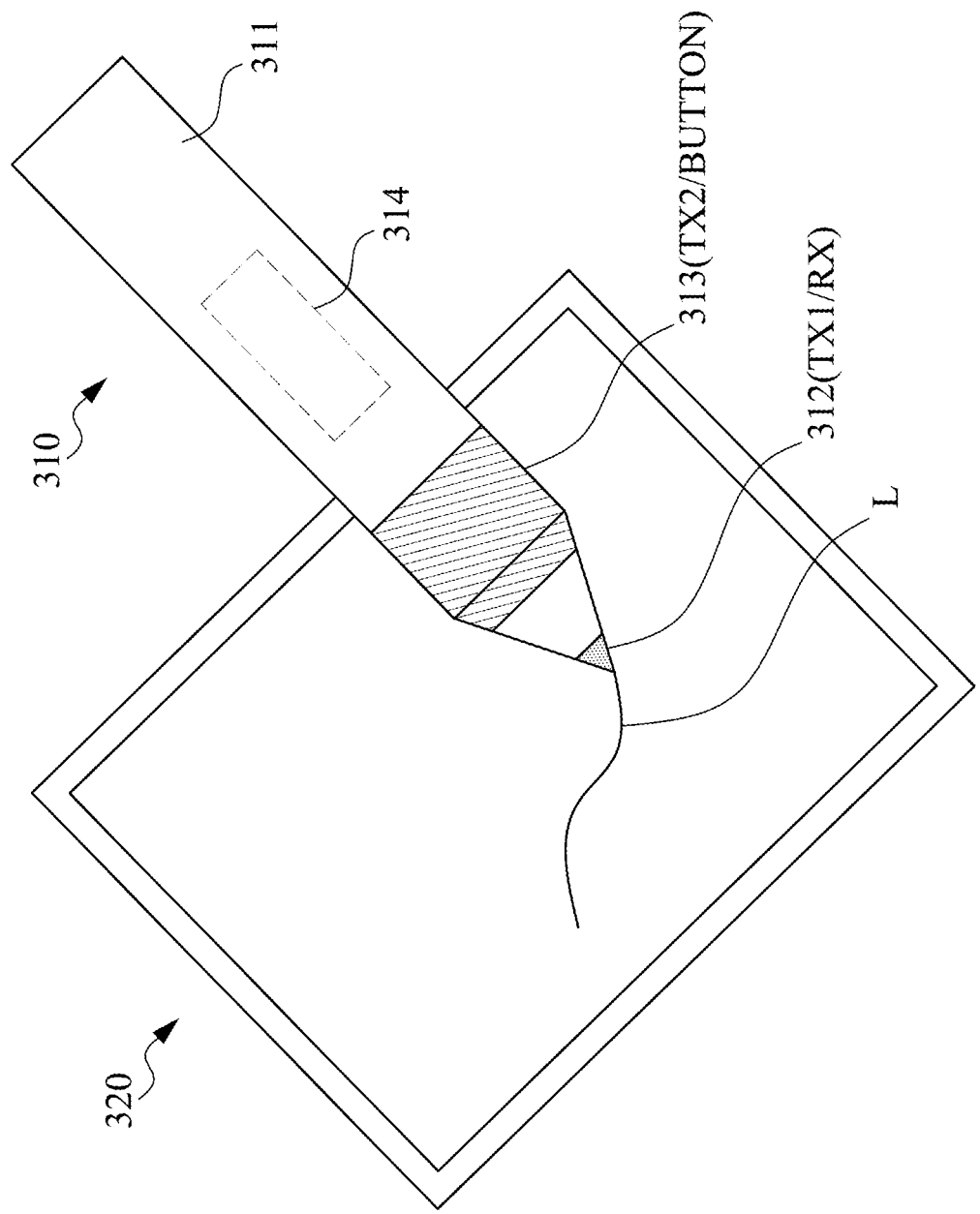
FIG. 3 is a schematic diagram illustrating a touch system according to some embodiments of the present disclosure.

Reference is made to FIG. 3. FIG. 3 is a schematic diagram illustrating a touch system 300 according to some embodiments of the present disclosure.

The touch system 300 includes an electronic device 310 and a touch panel 320. As illustrated in FIG. 3, the electronic device 310 can be an active stylus pen, and a user can utilize the electronic device 310 to interact with (e.g., to touch, to draw, or to write) the touch panel 320.

However, the aforementioned implementation of the electronic device 310 is merely for illustration, and the present disclosure is not limited thereto. Other suitable electronic devices are with the contemplated scopes of the present disclosure.

As illustrated in FIG. 3, the electronic device 310 includes a body 311, an electrode structure 312, an electrode structure 313, and a control circuit 314. The body 311 is in a pen-shape. The electrode structure 312 is disposed on the body 311. To be more specific, the electrode structure 312 is disposed at a tip portion of the body 311. The electrode structure 313 is disposed on the body 311. To be more specific, the electrode structure 313 is disposed at a ring portion of the body 311, and the ring portion is near fingers of the user when the user holds the electronic device 310. The control circuit 314 is disposed inside the body 311 and coupled to the electrode structure 312 and the electrode structure 313. The control circuit 314 is configured to control the electrode structure 312 and the electrode structure 313.

However, shapes of the electrode structure 312 and the electrode structure 313 in FIG. 3 are merely for illustration, and the present disclosure is not limited thereto. Other suitable shapes are with the contemplated scopes of the present disclosure.

Similar to FIG. 1, the control circuit 314 can control the electrode structure 312 to transmit a transmitting signal TX1 to the touch panel 320. The touch panel 320 can receive the transmitting signal TX1. Accordingly, a processor in the touch panel 320 can detect a touch position according to signal intensity of the received transmitting signal TX1, and the processor in the touch panel 320 can perform a corresponding operation according to the detected touch position.

One of main differences between FIG. 3 and FIG. 1 is that, the control circuit 314 can also control the electrode structure 312 to receive a receiving signal RX from the touch panel 320. The receiving signal RX can be used to synchronize the electronic device 310 and the touch panel 320. For example, the receiving signal RX can be used to synchronize a clock signal of the electronic device 310 and a clock signal of the touch panel 320.

In addition, the control circuit 314 can control the electrode structure 313 to transmit a transmitting signal TX2 to the touch panel 320. The touch panel 320 can receive the transmitting signal TX1 and the transmitting signal TX2. Accordingly, a processor in the touch panel 320 can determine a tile angle of the electronic device 310 according to a distance between a first position on the touch panel 320 and a second position on the touch panel 320, in which the transmitting signal TX1 is received at the first position on the touch panel 320 and the transmitting signal TX2 is received at the second position on the touch panel 320. For example, when the aforementioned distance is longer, the tile angle of the electronic device 310 from a vertical line is larger. On the contrary, when aforementioned distance is shorter, the tile angle of the electronic device 310 from the vertical line is smaller.

Further, the control circuit 314 can control the electrode structure 313 to work as a button (button operation BUTTON). To be more specific, the control circuit 314 can control the electrode structure 313 to detect a touch event. The touch object can be one or more fingers of the user. The electrode structure 313 can be a self-capacitance type or a mutual-capacitance type. The control circuit 314 can control the electronic device 310 to perform an operation according to the touch event. For example, in some embodiments, when a finger touches (presses) the electrode structure 313, a color of a handwriting line L shown on the touch panel 320 along a trajectory of the tip portion of the electronic device 310 is changed (e.g., changed from red to blue). In some embodiments, when a finger touches (presses) the electrode structure 313, a thickness of the handwriting line L is changed (e.g., thicker or thinner).

Figure 4:
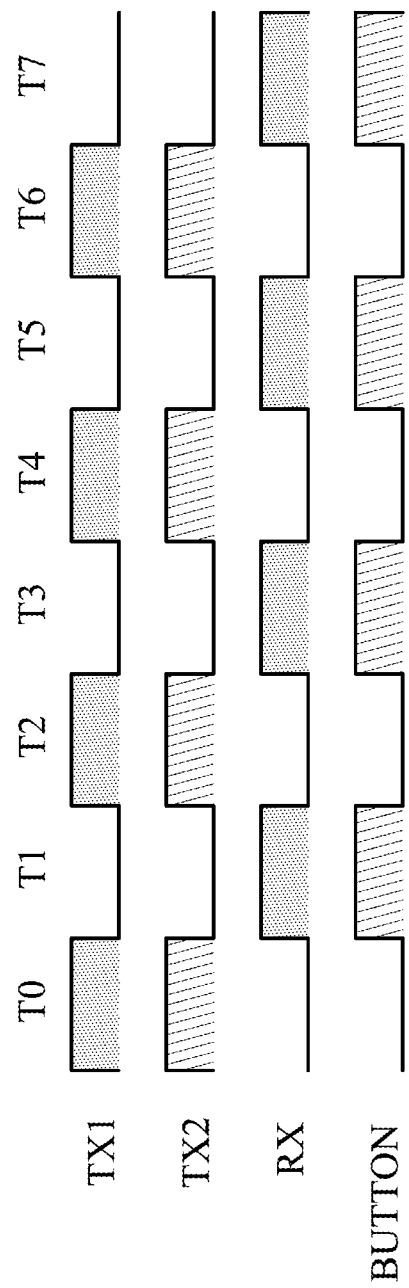
FIG. 4 is a schematic diagram illustrating operations of the electronic device in FIG. 3 according to some embodiments of the present disclosure.

References are made to FIG. 3 and FIG. 4. FIG. 4 is a schematic diagram illustrating operations of the electronic device 310 in FIG. 3 according to some embodiments of the present disclosure.

The electronic device 310 adopts a time-division mechanism. As illustrated in FIG. 4, the electrode structure 312 transmits the transmitting signal TX1 to the touch panel 320 during time intervals TO, T2, T4, and T6. The electrode structure 313 transmits the transmitting signal TX2 to the touch panel 320 during the time intervals TO, T2, T4, and T6. The electrode structure 312 receives the receiving signal RX from the touch panel 320 during time intervals T1, T3, T5, and T7. The electrode structure 313 works as the button during the time intervals T1, T3, T5, and T7.

However, an order of operations of the electronic device 310 in FIG. 4 is merely for illustration, and the present disclosure is not limited thereto. Other suitable orders are with the contemplated scopes of the present disclosure.

Figure 5:
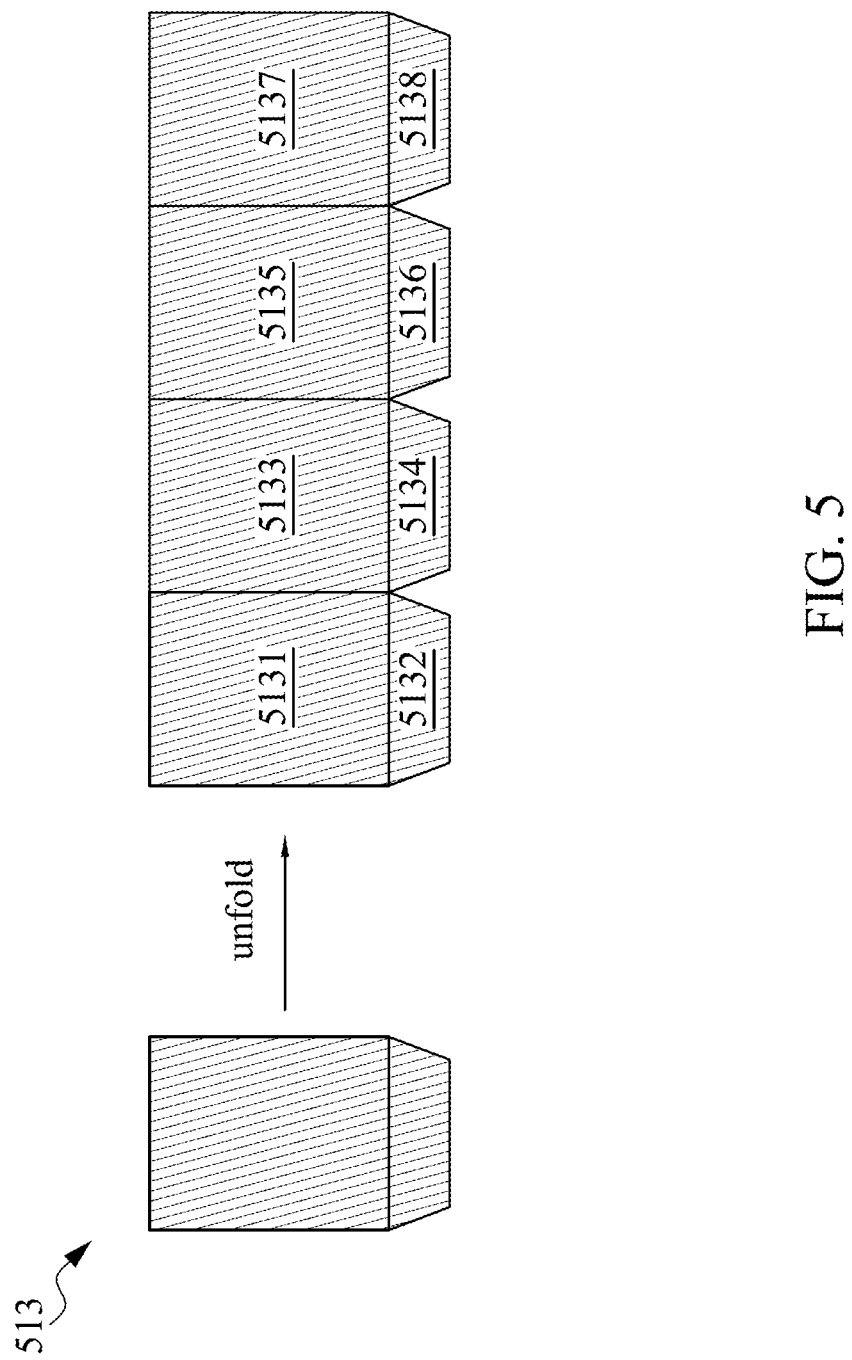
FIG. 5 is a schematic diagram illustrating an electrode structure according to some embodiments of the present disclosure.

Reference is made to FIG. 5. FIG. 5 is a schematic diagram illustrating an electrode structure 513 according to some embodiments of the present disclosure.

In some embodiments, the electrode structure 513 can be used to implement the electrode structure 113 in FIG. 1 or the electrode structure 313 in FIG. 3.

As illustrated in FIG. 5, the electrode structure 513 includes sub-electrodes 5131-5138. In some embodiments, the electrode structure 513 can be implemented by a flexible printed circuit (FPC) board or other flexible touch film.

Figure 6:
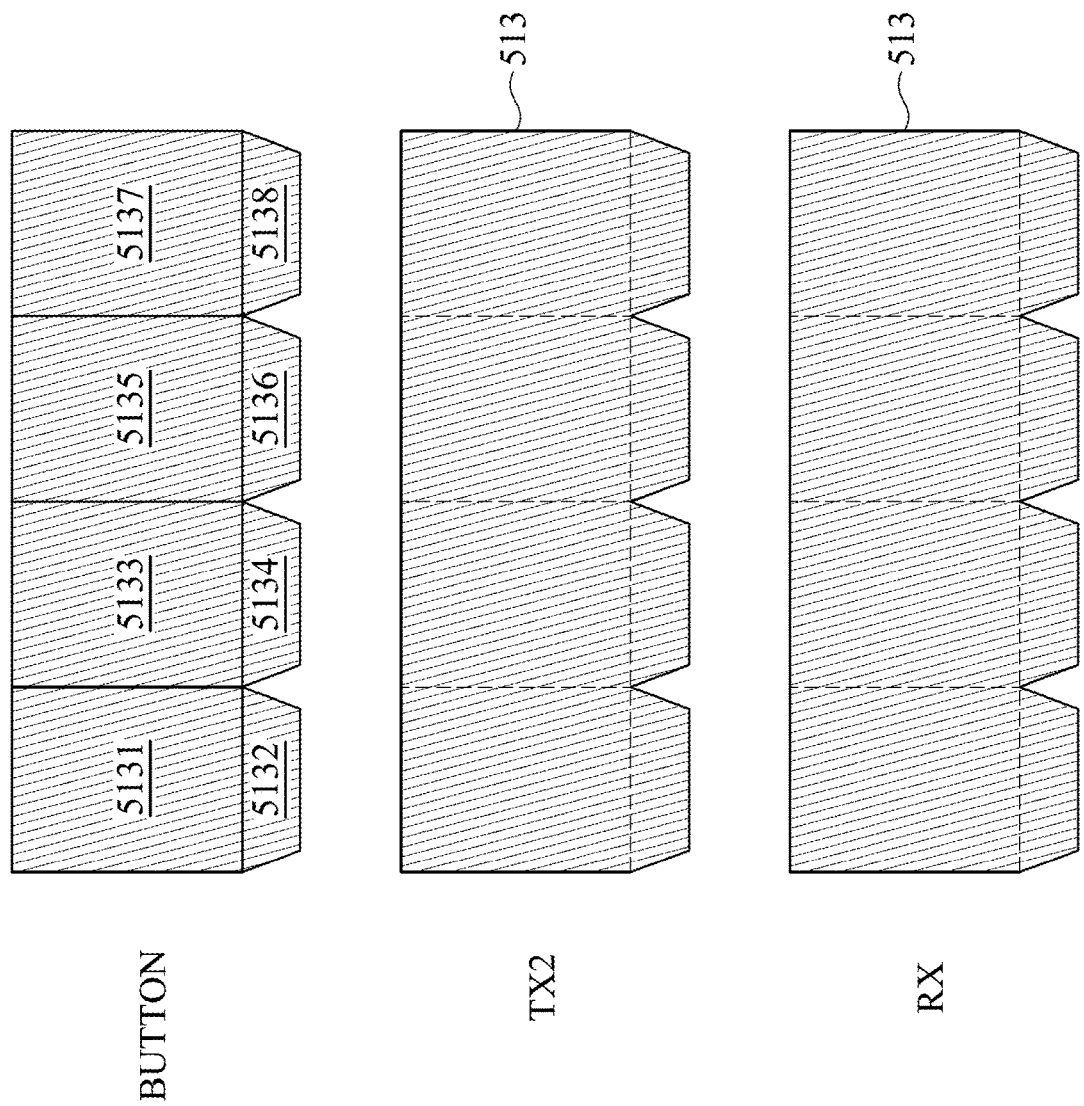
FIG. 6 is a schematic diagram illustrating operations of the electrode structure in FIG. 5 according to some embodiments of the present disclosure.

FIG. 6 is a schematic diagram illustrating operations of the electrode structure 513 in FIG. 5 according to some embodiments of the present disclosure. FIG. 6 and following paragraphs take the electrode structure 513 implementing the electrode structure 113 in FIG. 1 as an example.

References are made to FIG. 1 and FIG. 6. When the control circuit 114 controls the electrode structure 513 to work as the button (button operation BUTTON), the sub-electrodes 5131-5138 can correspond to different channels and the control circuit 114 controls the sub-electrodes 5131-5138 to detect the touch event and controls the electronic device 110 to perform the operation according to capacitance values of the sub-electrodes 5131-5138.

In some embodiments, the sub-electrodes 5131-5138 can be independent. For example, when a finger touches (presses) the sub-electrode 5131, the capacitance value of the sub-electrodes 5131 is changed. Accordingly, the control circuit 114 can change the color of the handwriting line L according to the capacitance value of the sub-electrodes 5131. When a finger touches (presses) the sub-electrode 5133, the capacitance value of the sub-electrode 5133 is changed. Accordingly, the control circuit 114 can change the thickness of the handwriting line L according to the capacitance value of the sub-electrode 5133. When a finger touches (presses) the sub-electrode 5135, the capacitance value of the sub-electrode 5135 is changed. Accordingly, the control circuit 114 can control the electronic device 110 to work as an eraser which can delete the handwriting line L according to the capacitance value of the sub-electrodes 5135.

In some embodiments, the capacitance values of the sub-electrodes 5131-5138 correspond to a gesture. For example, when a finger slides along a first direction (e.g., slides through the sub-electrodes 5131, 5133, 5135, and 5137 sequentially), the capacitance values of the sub-electrodes 5131, 5133, 5135, and 5137 are changed sequentially. Accordingly, the control circuit 114 can change the color of the handwriting line L according to the change order of the capacitance values of the sub-electrodes 5131, 5133, 5135, and 5137. When a finger slides along a second direction (e.g., slides through the sub-electrodes 5137, 5135, 5133, and 5131 sequentially), the capacitance values of the sub-electrodes 5137, 5135, 5133, and 5131 are changed sequentially. Accordingly, the control circuit 114 can change the thickness of the handwriting line L according to the change order of the capacitance values of the sub-electrodes 5137, 5135, 5133, and 5131.

In addition, when the control circuit 114 controls the electrode structure 513 to transmit the transmitting signal TX2 to the touch panel 120 or to receive the receiving signal RX from the touch panel 120, the control circuit 114 can short the sub-electrodes 5131-5138 such that the electrode structure 513 works as a single transmitter or a single receiver. In some embodiments, the control circuit 114 can send same signals (e.g., the transmitting signals TX2) to the sub-electrodes 5131-5138 or control the sub-electrodes 5131-5138 to receive same signals (e.g., the receiving signals RX) such that the sub-electrodes 5131-5138 can be regarded as being shorted electrically.

However, the quantity of the sub-electrodes 5131-5138 in FIG. 5 is merely for illustration, and the present disclosure is not limited thereto. Other suitable quantities are with the contemplated scopes of the present disclosure.

Figure 7:
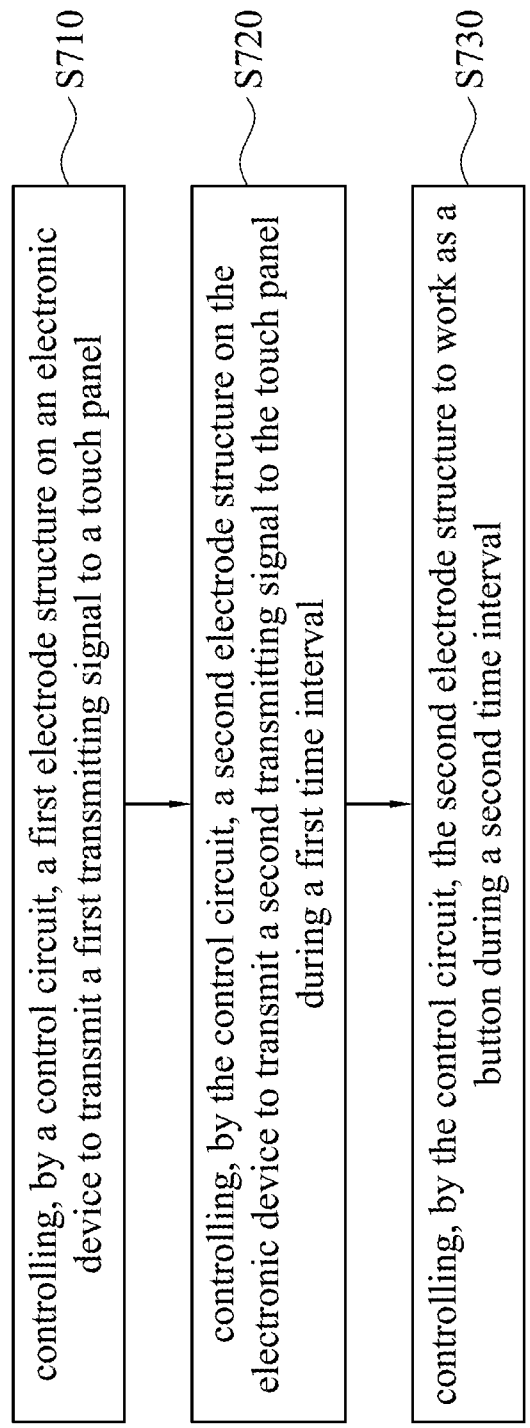
FIG. 7 is a flow diagram illustrating a control method according to some embodiments of the present disclosure.

Reference is made to FIG. 7. FIG. 7 is a flow diagram illustrating a control method 700 according to some embodiments of the present disclosure. In some embodiments, the control method 700 can be applied to the control circuit 114 in FIG. 1 or the control circuit 314 in FIG. 3, but the present disclosure is not limited thereto.

As illustrated in FIG. 7, the control method 700 includes operations S710, S720, and S730. For better understanding, the control method 700 is described with reference to the touch system 100 in FIG. 1.

In operation S710, the control circuit 114 controls the electrode structure 112 on the electronic device 110 to transmit the transmitting signal TX1 to the touch panel 120. In some embodiments, the electrode structure 112 is disposed at the tip portion of the body 111.

In operation S720, the control circuit 114 controls the electrode structure 113 on the electronic device 110 to transmit the transmitting signal TX2 to the touch panel 120 during a first time interval (e.g., the time interval T1 in FIG. 2). In some embodiments, the electrode structure 113 is disposed at the ring portion of the body 111, and the ring portion is near fingers of a user when the user holds the electronic device 110.

In operation S730, the control circuit 114 controls the electrode structure 113 to work as the button during a second time interval (e.g., the time interval T3 in FIG. 2). In other words, the electrode structure 113 adopts the time-division mechanism for different functions such that the quantity of the electrode structure of the electronic device 110 can be reduced.

Based on the descriptions above, in the present disclosure, the electronic device can include fewer electrode structures such that the assembly of the electronic device can be simpler, and cost and the interference between signals can be reduced.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control circuit, configured to control a first electrode structure on an electronic device to transmit a first transmitting signal to a touch panel,
wherein the control circuit is further configured to control a second electrode structure comprising a plurality of sub-electrodes disposed on and surrounding a ring portion of the electronic device to transmit a second transmitting signal to the touch panel during a first time interval, and configured to detect a touch event on the plurality of sub-electrodes of the second electrode structure during a second time interval,
wherein the control circuit is further configured to control the first electrode structure to transmit the first transmitting signal to the touch panel during a third time interval.

2. The control circuit of claim 1, wherein the electronic device is an active stylus pen, wherein when the touch event is detected on the plurality of sub-electrodes of the second electrode structure, the control circuit controls a handwriting line drawn by the active stylus pen according to the touch event detected on the plurality of sub-electrodes of the second electrode structure.

3. The control circuit of claim 1, wherein the control circuit is further configured to detect the touch event on the plurality of sub-electrodes of the second electrode structure according to a plurality of capacitance values of the plurality of sub-electrodes during the second time interval.

4. The control circuit of claim 3, wherein the plurality of capacitance values correspond to a gesture.

5. The control circuit of claim 3, wherein the control circuit is further configured to control the plurality of sub-electrodes to transmit a plurality of the second transmitting signals to the touch panel during the first time interval.

6. The control circuit of claim 3, wherein the control circuit is further configured to control the plurality of sub-electrodes to receive a plurality of receiving signals from the touch panel during a fourth time interval.

7. An electronic device, comprising:
a body;
a first electrode structure disposed on the body and controlled to transmit a first transmitting signal to a touch panel; and
a second electrode structure comprising a plurality of sub-electrodes disposed on and surrounding a ring portion of the body, wherein the second electrode structure is controlled to transmit a second transmitting signal to the touch panel during a first time interval, and the second electrode structure is detected to determine whether there is a touch event occurred on the plurality of sub-electrodes of the second electrode structure during a second time interval,
wherein the first electrode structure is controlled to transmit the first transmitting signal to the touch panel during a third time interval.

8. The electronic device of claim 7, wherein the first electrode structure and the second electrode structure are controlled by a control circuit in the electronic device.

9. The electronic device of claim 7, wherein the electronic device is an active stylus pen.

10. The electronic device of claim 7, wherein the first electrode structure is disposed on a tip portion of the body.

11. The electronic device of claim 7, wherein the plurality of sub-electrodes are controlled to work as different channels, or work together to be a single transmitter or a single receiver.

12. A control method, comprising:
controlling, by a control circuit, a first electrode structure on an electronic device to transmit a first transmitting signal to a touch panel;
controlling, by the control circuit, a second electrode structure comprising a plurality of sub-electrodes disposed on and surrounding a ring portion of the electronic device to transmit a second transmitting signal to the touch panel during a first time interval; and
detecting, by the control circuit, a touch event on the plurality of sub-electrodes of the second electrode structure during a second time interval,
wherein the first electrode structure is controlled to transmit the first transmitting signal to the touch panel during a third time interval.

13. The control method of claim 12, further comprising:
controlling, by the control circuit, the plurality of sub-electrodes of the second electrode structure to receive a plurality of receiving signals from the touch panel during a fourth time interval.

14. The control method of claim 12, wherein the electronic device is an active stylus pen.

* * * * *